United States Patent [19]

Satoh

[11] Patent Number: 4,469,138
[45] Date of Patent: Sep. 4, 1984

[54] PIPES MADE OF POLYPROPYLENE REINFORCED WITH CARBON FIBERS

[75] Inventor: Hiroaki Satoh, Tokyo, Japan

[73] Assignee: Kureha Kagaku Kogyo Kabushiki Kaisha, Tokyo, Japan

[21] Appl. No.: 563,540

[22] Filed: Dec. 20, 1983

Related U.S. Application Data

[63] Continuation of Ser. No. 288,798, Jul. 31, 1981, abandoned.

[30] Foreign Application Priority Data

May 16, 1980 [JP] Japan .................................. 55/63998

[51] Int. Cl.$^3$ ............................................... F16L 9/00
[52] U.S. Cl. .................................... 138/174; 138/177; 428/36; 524/495; 524/496; 524/522
[58] Field of Search .................. 138/174, 177; 428/36; 524/495, 496, 522

[56] References Cited

U.S. PATENT DOCUMENTS

4,057,610  11/1977  Goettler et al. ..................... 138/174

FOREIGN PATENT DOCUMENTS

2324382   2/1974   Fed. Rep. of Germany .
1251641  10/1971   United Kingdom .
1442527   7/1976   United Kingdom .

Primary Examiner—William R. Dixon, Jr.
Attorney, Agent, or Firm—Finnegan, Henderson, Farabow, Garrett & Dunner

[57] ABSTRACT

Pipes of polypropylene reinforced with carbon fibers comprising 100 parts by weight of polypropylene, 10 to 40 parts by weight of a modified polypropylene by an organic unsaturated carboxylic acid or a copolymer of propylene and the organic unsaturated carboxylic acid and 5 to 70 parts by weight of carbon fibers of 5 to 30 micrometers in diameter and a ratio of diameter to length of 10 or more. The rate of retention of the original tensile strength of pipe in boiling water for 6 months at 100° C. was higher than 95%.

3 Claims, 5 Drawing Figures

Content of Carbon Fibers
(part by weight per 100 parts by weight of polypropylene)

PIPES MADE OF POLYPROPYLENE REINFORCED WITH CARBON FIBERS

This application is a continuation, of application Ser. No. 06/288,798, filed July 31, 1981, now abandoned.

SUMMARY OF THE INVENTION

The present invention provides novel pipes made of reinforced polypropylene which exhibit excellent strength even in boiling water. The main characteristic feature of the present invention is that the pipe is prepared by shaping a resin composition comprising polypropylene as the base material, modified polypropylene prepared by partially modifying polypropylene with an organic unsaturated carboxylic acid or by copolymerizing propylene and the organic unsaturated carboxylic acid and short carbon fibers. A characteristic feature of the thus prepared pipe is that the ratio of mechanical strength after holding the pipe for 6 months in boiling water at 100° C., to the original strength if higher than 95%.

BRIEF EXPLANATION OF DRAWING

FIG. 1, which shows the relationship between the tensile strength and the amount of modified polypropylene in a pipe, the composition contained polypropylene, modified polypropylene and carbon fiber (45 parts by weight per 100 parts of polypropylene). Curve 1 shows that of pipe containing modified polypropylene with maleic acid and Curve 2 shows that of pipe containing a copolymer of propylene and acrylic acid. In FIG. 2, which shows the rate of retention of the original tensile strength of a pipe, the composition was 45 parts by weight of carbon fiber, 30 parts by weight of modified polypropylene and 100 parts of polypropylene and the pipe was kept in boiling water at 100° C. Curve 1 shows the relationship in the pipe in which the modified polypropylene was obtained by chemically treating polypropylene with maleic acid to contain 2 parts by weight of maleic acid units per 100 parts by weight of propylene units. Curve 2 shows the relationship in the pipe in which the modified polypropylene was obtained by copolymerizing propylene and acrylic acid to contain 6 parts by weight of acrylic acid units per 100 parts by weight of propylene units. Curve 3 shows the relationship in a conventional reinforced polypropylene pipe containing 45 parts by weight of glass fiber per 100 parts by weight of polypropylene. In FIGS. 3 to 5, the compositin of the pipes and the composite material, except for carbon fibers, was 100 parts by weight of polypropylene and 30 parts by weight of modified polypropylene.

BACKGROUND OF THE INVENTION

Shaped articles and pipes able to withstand hot water at 100° C. have been used not only for industrial purposes but also, particularly, in recent years in pipings of central heating in homes in a large amount. As a synthetic resin for preparing such pipes to withstand hot water (boiling water at 100° C.), fluoropolymers, thermosetting resin reinforced by fibers or chlorinated polyvinyl chloride have been utilized. However, fluoropolymers cannot be generally used because of their poor processability and high price. Thermosetting resin reinforced by fibers is not suitable for mass production owing to its thermosetting property and chlorinated polyvinyl chloride is also not suitable for the purpose because its thermal resistence is at most 100° C. and because of its poor processability.

On the other hand, although polypropylene, a thermoplastic resin, is favorably processable and thermally resistant for use in such a temperature range, its coefficient of thermal expansion in a temperature range of 50° to 100° C. is as large as $18 \times 10^{-5}/°$ C. Accordingly, the deformation and displacement of a long pipe made of polypropylene is fairly large and in the case where the deformation and displacement is mechanically restrained, an accumulation of internal stress cause the pipe to break.

Figure 2:
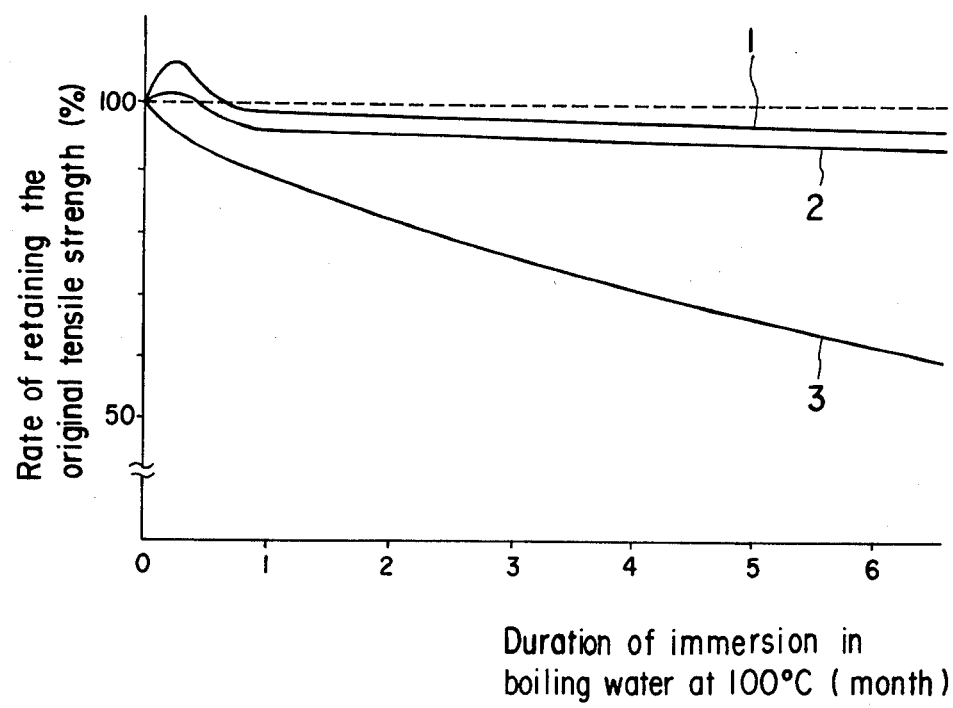
FIG. 2 shows the relationship between the rate of retention of the original tensile strength of the pipe with time in boiling water.

In order to make up for such a deficiency, an addition of a filler into the base material has been proposed. Taking into account the improvement of its strength, glass fibers have been used as the filler. However, it was found by the present inventor that polypropylene reinforced by glass fibers showed a conspicuous reduction of strength in boiling water. For instance, polypropylene reinforced by 45% by weight of glass fibers showed a conspicuous deterioration in strength with time as is seen in Curve 3 in FIG. 2. The use of carbon fibers instead of glass fibers has been proposed, but the reduction of its strength during a long term immersion in boiling water at 100° C. could not be prevented.

Accordingly, a solution to the problem of the reduction of mechanical strength during the immersion for a long period in boiling water has been sought in various fields.

DETAILED DESCRIPTION OF THE INVENTION

The present invention is based on the finding that pipe manufactured by shaping a composite material comprising 100 parts by weight of polypropylene, 10 to 40 parts by weight of modified polypropylene prepared by modifying a part of polypropylene with an organic unsaturated carboxylic acid of 3 to 10 carbon atoms or by copolymerizing the organic unsaturated carboxylic acid and propylene and 5 to 70 parts by weight of carbon fibers shows a small thermal expansion coefficient in boiling water at 100° C. and retains its original strength for a long time period in boiling water at 100° C.

Modified polypropylene a which is one of the most important factors in the present invention, means a chemically treated polypropylene obtained by modifying a part of a molecule of polypropylene with an organic unsaturated carboxylic acid of 3 to 10 carbon atoms or a copolymer of the organic unsaturated carboxylic acid and propylene. The degree of modification of polypropylene is in a range of 0.5 to 8%, preferably, 1 to 6%. An organic unsaturated carboxylic acid for use in the present invention is maleic acid, acrylic acid, methacrylic acid, fumaric acid, endobicyclo[2.2.1]2,3-dicarboxylic acid and the likes and their anhydrides. Maluic acid and acrylic acid are preferable.

Figure 1:
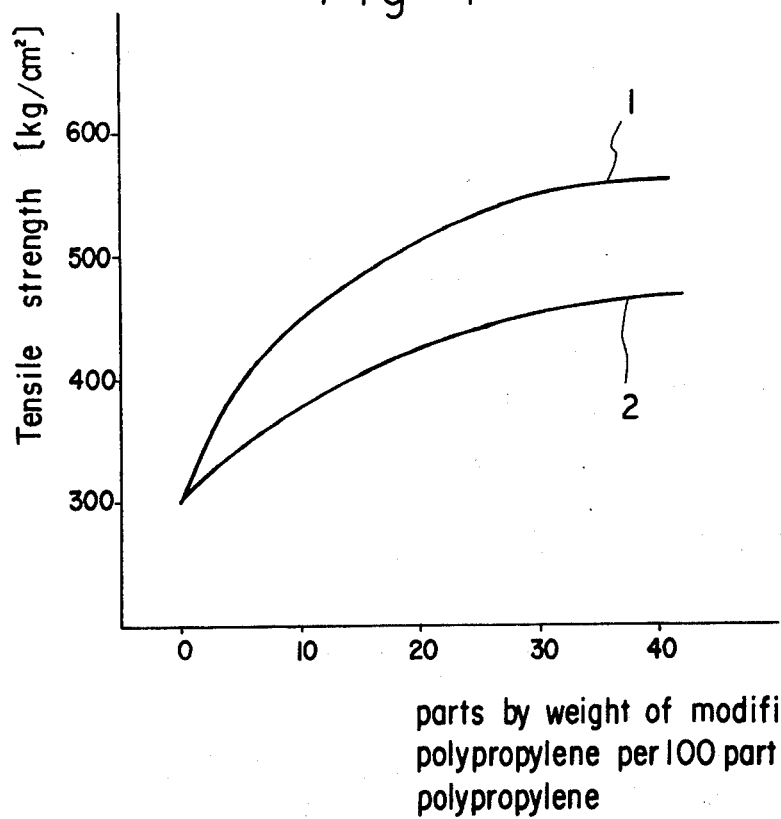
FIG. 1 shows the relationship between the tensile strength and the amount of modified polypropylene in the pipe of this invention.

In the case where the amount of the modified polypropylene is smaller than that mentioned above, the reduction in strength becomes larger as shown in FIG. 1 resulting it being insufficient for use in the intended purpose. On the other hand, in the case where the amount is larger than that mentioned above, a tendency in the reduction of thermal resistance is seen. Also the use of a larger amount of the modified polypropylene is not preferable from the view point of its cost.

In the present invention, the carbon fibers for use in reinforcing are 5 to 30 micrometers in diameter and higher than 10 in the aspect ratio (ratio of length to diameter). In addition, in order to enhance the adhesiveness of carbon fibers to polypropylene, the carbon fibers may be treated by surface-coating. For example, aminopropyltrioxysilane or vinylethoxysilane can be used to coat the surface of the carbon fibers.

Figure 3:
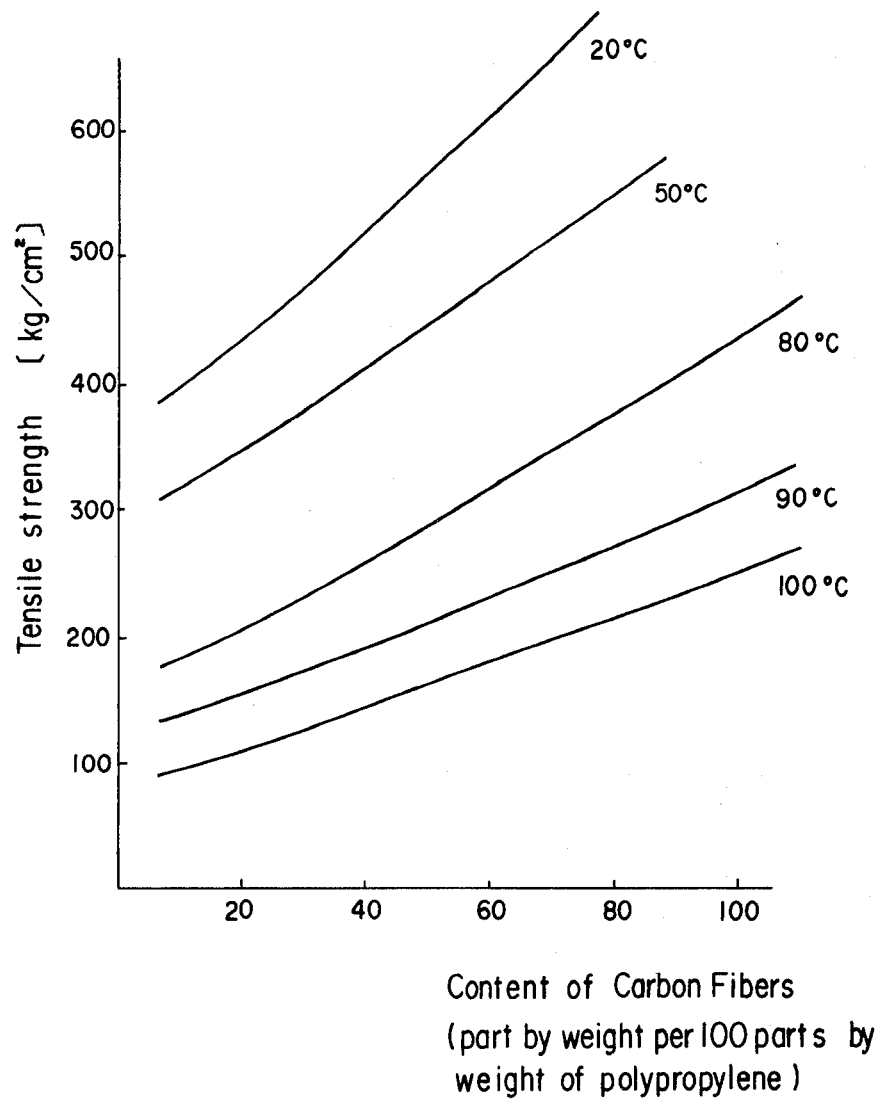
FIG. 3 shows the relationship between the tensile strength of the pipe and the content of carbon fiber at various temperatures.

Generally, the tensile strength of the material comprising polypropylene reinforced with carbon fibers is improved with an increase of the amount of carbon fibers in the material, the tendency being the saame at any one temperature from ordinary temperature to nearly 100° C. as is seen in FIG. 3. While the tensile strength is generally smaller at higher temperatures, the reduction in strength due to the temperature raise is largely prevented by the addition of carbon fibers into the composite material for shaping the pipe. Thus it is preferable to add carbon fibers in a large amount into polypropylene for the general improvement of the tensile strength of the shaped material. However, the melt fluidity of the composite material can be influenced by too much carbon fibers to the point where the processability of the composite material at molding becomes low. This situation will be understood from FIG. 4 wherein the melt index of the composition is referred to ASTM D-1238. In the case where the pipe according to the present invention is to be prepared by extrusion shaping the composite material, it can contain carbon fibers up to 70 parts by weight per 100 parts by weight of polypropylene and still processable. However, the preferable amount is around 50 parts by weight per 100 parts by weight of polypropylene from the view point of processability.

Figure 5:
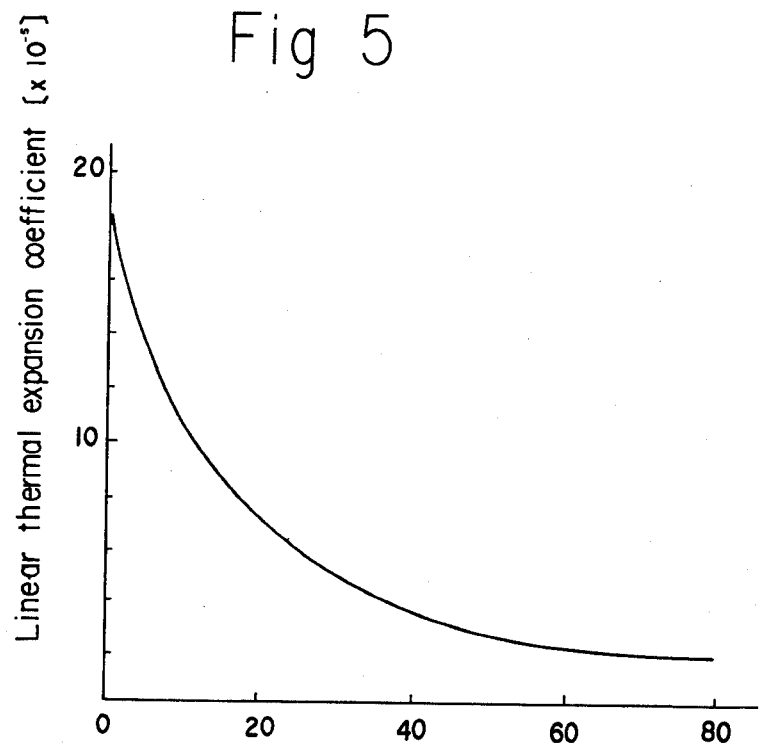
FIG. 5 shows the relationship between the linear thermal expansion coefficient of the pipe and the carbon fiber content.

In addition, the linear thermal expansion coefficient of the pipe made of composite material comprising polypropylene and carbon fibers is reduced with a content of carbon fibers higher than about 5 parts by weight per 100 parts by weight of polypropylene as is seen in FIG. 5. For example, the linear thermal expansion coefficients of pipes containing carbon fibers in the amounts of 0, 5 and 10 parts by weight per 100 parts by weight of polypropylene are $18-$, $13-$ and $10.5 \times 10^{-5}/°$ C., respectively. This large difference between the coefficients indicates the effect of carbon fibers on the dimensional stability of the pipe.

Figure 4:
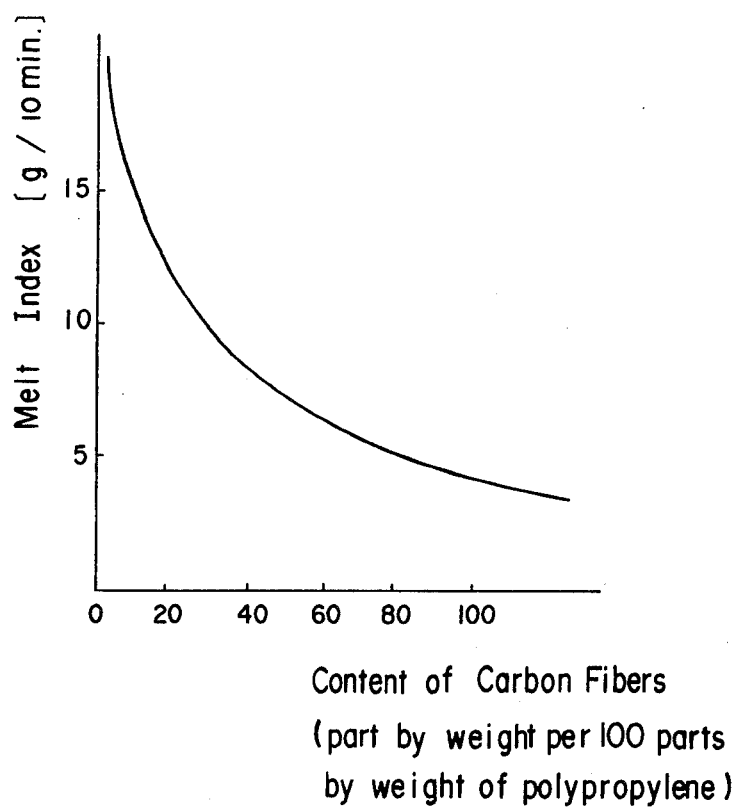
FIG. 4 shows the relationship between the melt index of the polymer composition and the carbon fiber content.

In conclusion, considering all of the above while taking into account the meaning of the illustrations in FIGS. 3 to 5, a suitable amount of carbon fibers in the pipe is from about 5 to 70 parts by weight per 100 parts by weight of polypropylene.

Pipe manufacture according to the present invention by shaping a composite material comprising reinforced polypropylene containing 5 to 70 parts by weight of carbon fibers per 100 parts by weight of polypropylene, differs from pipe shaped from polypropylene reinforced with glass fibers, because it has a small linear thermal expansion coefficient and shows only a slight deterioration while retaining more than 95% of the original strength even after a long period of use in boiling water at 100° C. Accordingly, the pipe of the present invention can be advantageously utilized in industrial and home uses for hot water.

The present invention will be further explained in detail while referring to non-limiting examples as follows:

EXAMPLE 1

Starting from a composite material comprising 100 parts by weight of polypropylene (product of Tonen Petrochemical Co., Ltd., Grade J-209 of melt index of 9.0), 30 parts by weight of modified polypropylene of melt index of 20.0 and melting point of 162° C., prepared by the chemical addition of 2 parts by weight of maleic acid to 100 parts by weight of polypropylene, and 45 parts by weight of carbon fiber of 14.5 micrometers in diameter and an aspect ratio of 50 (prepared by Kureha Kagaku Kogyo Kabushiki Kaisha, Grade M 107), pipes of reinforced polypropylene with carbon fibers having a wall thickness of 3 mm and 1 inch in nominal diameter were manufactured by extrusion shaping. While continuously immersing the thus manufactured pipe in boiling water at 100° C., test pieces were collected every moth during 6 months to be tested on their change of tensile strength, the results being shown in FIG. 2. As is seen in Curve 1 in FIG. 2, the rate of retention of the original tensile strength did not show any change during 6 months and showed a significant and excellent difference as compared to that of the pipe of reinforced polypropylene with glass fiber as shown by Curve 3. Thus the pipe according to the present invention would be good for practical uses.

EXAMPLE 2

Pipes were prepared under the same conditions as in Example 1 except a copolymer of melt index of 50 and melting point of 168° C., obtained by copolymerizing a mixture of 94 parts by weight of propylene and 6 part by weight of acrylic acid was used instead of the modified polypropylene with maleic acid in Example 1. As is seen in Curve 2 of FIG. 1, pipes prepared from this material had excellent characteristics.

What is claimed is:

1. A pipe for hot water of polypropylene reinforced with carbon fibers made from a composite material consisting essentially of:
   (a) 100 parts by weight of polypropylene;
   (b) 10 to 40 parts by weight of a modified polypropylene selected from the group of: (1) polypropylene modified by the chemical addition of from 1 to 8 parts by weight of an organic unsaturated carboxylic acid per 100 parts by weight of polypropylene, said acid being selected from the group consisting of maleic acid, acrylic acid, methacrylic acid, fumaric acid, endobicyclo (2.2.1)2, 3-dicarboxylic acid and their anydrides; and (2) propylene copolymerized with from 1 to 8 parts by weight of said carboxylic acid per 100 parts by weight of said propylene; and
   (c) from 5 to 70 parts by weight of carbon fibers having a diameter of from 5 to 30 micrometers and a ratio of diameter to length of at least 10.

2. The pipe of claim 1, wherein the modified polypropylene is polypropylene modified by the chemical addition of maleic acid.

3. The pipe of claim 1, wherein the modified polypropylene is a copolymer of propylene and acrylic acid.

* * * * *